(12) United States Patent
Kwak et al.

(10) Patent No.: US 11,253,806 B2
(45) Date of Patent: Feb. 22, 2022

(54) AIR CLEANER HAVING BUILT-IN VALVE AND INTAKE SYSTEM THEREOF

(71) Applicants: Hyundai Motor Company, Seoul (KR); Kia Motors Corporation, Seoul (KR)

(72) Inventors: Seong-Youn Kwak, Hwaseong-Si (KR); Ju-Ho Han, Suwon-Si (KR); Won-Seop Choi, Anyang-Si (KR); Sung-Hyuk Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

(21) Appl. No.: 16/577,206

(22) Filed: Sep. 20, 2019

(65) Prior Publication Data

US 2020/0122076 A1 Apr. 23, 2020

(30) Foreign Application Priority Data

Oct. 22, 2018 (KR) ........................ 10-2018-0125828

(51) Int. Cl.
*B01D 46/42* (2006.01)
*F16K 15/04* (2006.01)
(Continued)

(52) U.S. Cl.
CPC ....... *B01D 46/4272* (2013.01); *B01D 46/446* (2013.01); *B01D 46/46* (2013.01);
(Continued)

(58) Field of Classification Search
CPC .. B01D 46/46; B01D 46/446; B01D 46/0031; B01D 46/4272; B01D 2279/60;
(Continued)

(56) References Cited

U.S. PATENT DOCUMENTS 4,492,003 A * 1/1985 Boylan ................. B01D 41/04
134/183
5,699,759 A * 12/1997 Hollis ....................... F01P 3/20
123/41.08
(Continued)

FOREIGN PATENT DOCUMENTS

JP 2015-140751 A 8/2015
JP 2017-082664 A 5/2017
(Continued)

*Primary Examiner* — Minh Chau T Pham
(74) *Attorney, Agent, or Firm* — Morgan, Lewis & Bockius LLP

(57) ABSTRACT

An air cleaner may include a filter case configured to introduce, by a suction force of an internal space, ambient air being discharged through a filter provided in the internal space as intake air from which foreign substances are removed; and a built-in valve built in the internal space of the filter case and configured to form an ambient air introduction path for introducing the ambient air and an additional ambient air introduction path separated from the ambient air introduction path and to open the additional ambient air introduction path so that the ambient air flows into through the additional ambient air introduction path when the suction force is increased.

18 Claims, 9 Drawing Sheets

(51) Int. Cl.
*F16K 15/18* (2006.01)
*F16K 27/02* (2006.01)
*F16K 31/18* (2006.01)
*B01D 46/44* (2006.01)
*B01D 46/46* (2006.01)
*F02M 35/024* (2006.01)
*F02M 35/10* (2006.01)
*F02M 35/08* (2006.01)
*F02M 35/02* (2006.01)
*B01D 46/52* (2006.01)

(52) U.S. Cl.
CPC ...... *F02M 35/0201* (2013.01); *F02M 35/024* (2013.01); *F02M 35/088* (2013.01); *F02M 35/10255* (2013.01); *F16K 15/04* (2013.01); *F16K 15/1823* (2021.08); *B01D 46/521* (2013.01); *B01D 2279/60* (2013.01)

(58) Field of Classification Search
CPC .... F02M 35/024; F02M 35/02; F02M 35/084; F02M 35/0201; F02M 35/10255; F16K 15/04; F16K 15/1823; F16K 31/18; F16K 27/0245
USPC .............. 55/385.3; 123/41.08, 41.86, 198 E
See application file for complete search history.

(56) References Cited

U.S. PATENT DOCUMENTS

| | | | |
|---|---|---|---|
| 6,918,939 B2 * | 7/2005 | Dworatzek | B01D 46/0087 55/313 |
| 8,048,179 B2 | 11/2011 | Miller et al. | |
| 8,137,425 B2 * | 3/2012 | Saito | F02M 35/10013 55/385.3 |
| 8,763,635 B2 * | 7/2014 | Erdmann | B60K 15/03519 137/533.11 |
| 2004/0140258 A1 | 7/2004 | Jainek et al. | |
| 2010/0050578 A1 * | 3/2010 | Khouw | B01D 45/02 55/290 |
| 2010/0050865 A1 * | 3/2010 | Johnson | F02M 35/10321 95/17 |
| 2011/0017155 A1 * | 1/2011 | Jacob | B01D 46/0031 123/41.86 |
| 2013/0220261 A1 | 8/2013 | Yun et al. | |
| 2014/0352271 A1 * | 12/2014 | Jacob | B01D 46/0087 55/492 |
| 2018/0252191 A1 * | 9/2018 | Pitcel | F02M 37/08 |

FOREIGN PATENT DOCUMENTS

| | | |
|---|---|---|
| KR | 10-1997-0066048 A | 10/1997 |
| KR | 10-2005-0047417 A | 5/2005 |
| KR | 10-1382282 B1 | 4/2014 |
| KR | 10-1655645 B1 | 9/2016 |

* cited by examiner

AIR CLEANER HAVING BUILT-IN VALVE AND INTAKE SYSTEM THEREOF

CROSS-REFERENCE TO RELATED APPLICATION

The present application claims priority to Korean Patent Application No. 10-2018-0125828, filed on Oct. 22, 2018, the entire contents of which is incorporated herein for all purposes by this reference.

BACKGROUND OF THE INVENTION

Field of the Invention

The present invention relates to an air cleaner, and particularly, to an intake system adopting an air cleaner having a built-in valve, in which an externally attached type performance improvement structure may be built inside the air cleaner.

Description of Related Art

In general, a vehicle intake system maintains an engine performance by supplying air flow to a combustion chamber of an engine, and an air cleaner provided with the intake system prevents an inflow of foreign substances by converting ambient air flowing to the intake system into intake air from which the foreign substances are strained.

The air cleaner is helpful in improving fuel economy of the vehicle by increasing the intake air flow to suit the required air flow level that becomes heightened on high engine load condition. For this, the air cleaner may include an externally attached type performance improvement structure including an auxiliary intake duct, a variable valve, and a drain valve (or unloading valve or water drain valve). The externally attached type performance improvement structure is united with the air cleaner as surrounding the external of the air cleaner (i.e., air cleaner housing).

As an example, the auxiliary intake duct has a long duct structure surrounding the external of the air cleaner, and increases ambient air flow to the internal to the air cleaner so that the intake air flow is increased to match the required air flow on the high engine load condition. The variable valve is provided in the auxiliary intake duct, and adjusts the air flow in a path of the auxiliary intake duct through adjustment of a valve opening/closing amount in accordance with a vehicle overload condition. The drain valve is connected to a long hose surrounding the external of the air cleaner, and removes water gathered inside the air cleaner through adjustment of the valve movement by self-weight of the water.

Accordingly, the intake system can prevent the foreign substances from flowing into the air cleaner adopting the externally attached type performance improvement structure using the auxiliary intake duct, the variable valve, and the drain valve, and thus can further improve the fuel economy of the vehicle.

However, the air cleaner requires the following improvements due to the externally attached type performance improvement structure using the auxiliary intake duct, the variable valve, and the drain valve.

First, from the viewpoint of its weight, the weight of the air cleaner is increased due to the auxiliary intake duct, the drain hose, the variable valve, and the drain valve. Second, from the viewpoint of its size, the external size of the air cleaner is extended due to the auxiliary intake duct and the drain hose. Third, from the viewpoint of its manufacturing cost, the manufacturing cost of the air cleaner is increased due to the self-costs of the auxiliary intake duct, the drain hose, the variable valve, and the drain valve and the costs for sealing connection portions thereof. Fourth, from the viewpoint of its complexity, the air cleaner structure becomes complicated due to the auxiliary intake duct, the drain hose, the variable valve, and the drain valve The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air cleaner and an intake system thereof, which can overcome the drawback due to the externally attached structure of the air cleaner by uniting functions of a duct, a hose, and a valve into one built-in valve and building the built-in valve inside the air cleaner, and can implement improvement of the engine output and fuel economy and performance coping with an inflow of foreign substances more effectively by automating opening and closing operations of the built-in valve with an engine load caused by an internal factor, such as an engine power performance, and a buoyant force caused by an external factor, such as water inflow.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, an air cleaner may include a filter case configured to introduce, by a suction force of an internal space, ambient air being discharged through a filter provided in the internal space as intake air from which foreign substances are removed; and a built-in valve built in the internal space of the filter case and configured to form an ambient air introduction path for introducing the ambient air and an additional ambient air introduction path separated from the ambient air introduction path and to open the additional ambient air introduction path so that the ambient air flows into through the additional ambient air introduction path when the suction force is increased.

As an exemplary embodiment of the present invention, the ambient air introduction path and the additional ambient air introduction path are separately located in predetermined locations of the filter case, and the ambient air introduction path is formed on a side surface of the filter case, wherein the additional ambient air introduction path is formed at a lower portion of the filter case.

As an exemplary embodiment of the present invention, the built-in valve is configured to open the additional ambient air introduction path even by a buoyant force of water gathered around the additional ambient air introduction path in the internal space of the filter case.

As an exemplary embodiment of the present invention, the built-in valve may include a valve fixer configured to form the additional ambient air introduction path through an open hole in the internal space of the filter case, and a ball valve coupled to the valve fixer and configured to receive the suction force and the buoyant force.

As an exemplary embodiment of the present invention, the valve fixer is configured to form a water storage space filled with water in the internal space of the filter case, and the water storage space is configured to surround the additional ambient air introduction path.

As an exemplary embodiment of the present invention, the ball valve may include a ball configured to receive the suction force and the buoyant force and to ascend to open the additional ambient air introduction path, an insulator coupled to the valve fixer and configured to form a flow hole communicating with the open hole and selectively clogged by the ball, and a ball guide having a lattice frame structure and configured to make the air and the water pass through the ball guide as confining the ball and limiting an ascending distance of the ball.

As an exemplary embodiment of the present invention, the valve fixer and the insulator are coupled to each other in an insertion structure using a position ring projecting to surround the open hole of the valve fixer and an insertion groove recessed on an external periphery of an insulator body in which the flow hole of the insulator is pierced.

As an exemplary embodiment of the present invention, the valve fixer and the ball guide are coupled to each other in a hook structure using an insertion hole pierced on a position girth forming a circumference surrounding the open hole of the valve fixer and a hook of an insertion end portion projecting from an end portion of one side of the ball guide. The hook is bent inwardly from an end portion of the insertion end portion and is hooked in contact with a surface of the position girth.

As an exemplary embodiment of the present invention, the filter case may include an upper housing and a lower housing detachably attached to each other by a clamp, and the ambient air introduction path and the additional ambient air introduction path are formed in the lower housing. An intake port for inflow of the ambient air to the ambient air introduction path is provided in the lower housing, and an intake airflow port for discharging the intake air is provided in the upper housing.

In accordance with various exemplary embodiments of the present invention, an intake system may include an air cleaner provided with a filter case configured to convert ambient air introduced from an intake port through a filter in an internal space into intake air from which foreign substances are removed and to discharge the intake air from an intake airflow port, and a built-in valve configured to be opened by an increase of a suction force due to an increase of an engine load to introduce the ambient air through the intake port and another path or to be opened by a buoyant force of water gathered in the internal space to discharge the water; an ambient duct connected to the intake port and configured to draw the ambient air; and an intake airflow duct connected to the intake airflow port and configured to send the intake air to an intake manifold connected to an engine.

As an exemplary embodiment of the present invention, the built-in valve is built in the internal space of the filter case, and a water storage space for generating the buoyant force is formed around the built-in valve in the internal space.

Since the performance improvement structure is accommodated inside the air cleaner applied to the intake system according to an exemplary embodiment of the present invention through the built-in valve, the air cleaner implements the following operations and effects.

First, it is possible to automate the operation of the built-in valve with a simple structure by increasing the air flow through automatic opening through the engine load on an increased engine load condition and draining the water through automatic opening through the buoyant force on the water inflow condition inside the air cleaner. Second, it is possible to improve the maximum engine output by improving the performance of the intake system through improvement of the suction pressure performance in accordance with the intake resistance reduction of the air cleaner. Third, it is possible to improve the filter lifespan through improvement of the filter pollution due to moisture together with the foreign substance separation performance of the air cleaner. Fourth, it is possible to greatly reduce the manufacturing costs of the air cleaner through deletion of an auxiliary intake duct that causes the great increase of the costs, the drain hose, the variable valve, and the drain valve. Fifth, since the intake system can achieve performance improvement with reduced costs, it is possible to apply the intake system to a small vehicle with generality.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
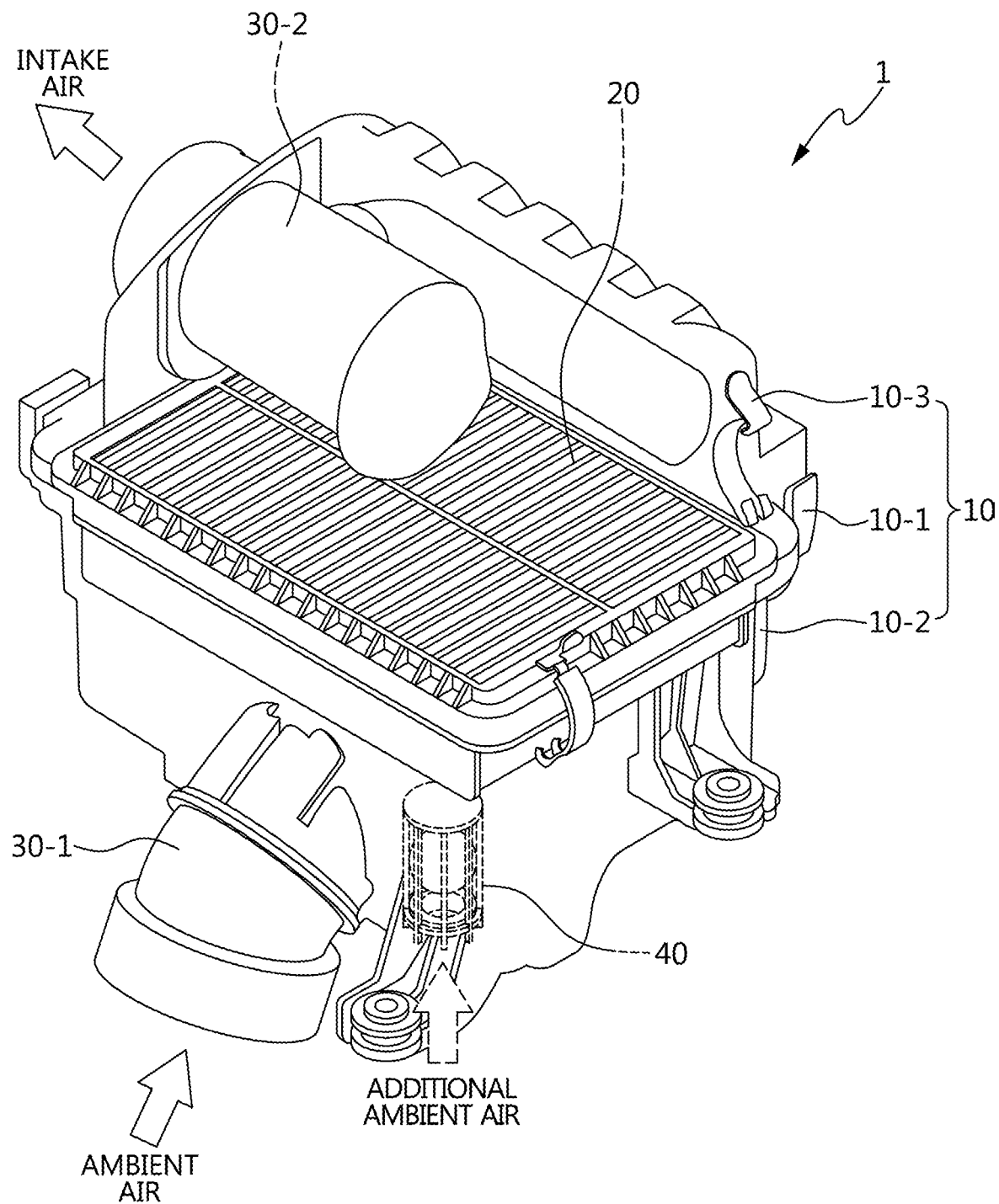
FIG. 1 is a diagram illustrating the configuration of an air cleaner adopting a built-in valve according to an exemplary embodiment of the present invention.

Referring to FIG. 1, an air cleaner 1 includes a filter case 10, a filter 20, an intake port 30-1, an intake airflow port 30-2, and a built-in valve 40. An internal space of the filter case 10 forms an air flow by a suction force that suits the strength of an engine load increased or decreased on an engine operation condition, and through the air flow, ambient air introduced through the filter 20 is converted into intake air, from which foreign substances are removed, to be discharged. The intake port 30-1 forms an ambient air introduction path for introducing the ambient air to the internal space of the filter case 10.

On the other hand, the built-in valve 40 forms a separate additional ambient air introduction path separated from the ambient air introduction path, and when the suction force is increased, the built-in valve 40 opens the additional ambient air introduction path to form the additional ambient air introduction path for additionally introducing the ambient air into the internal space of the filter case 10.

As an example, the filter case 10 includes an upper housing 10-1 and a lower housing 10-2 detachably attached to each other by a clamp 10-3. The filter 20 is located in the internal space formed by the upper housing 10-1 and the lower housing 10-2 to strain the foreign substances of the introduced ambient air, and includes non-woven fabric or filter paper.

As an example, the intake port 30-1 is provided on the outside of the lower housing 10-2 to be united with the filter case 10, and is connected to a duct (e.g., refer to ambient duct 100-1A of FIG. 7B) through which the ambient air flows to introduce the ambient air to the internal space of the filter case 10. The intake airflow port 30-2 is provided in the internal space of the upper housing 10-1 to be united with the filter case 10, and is connected to a duct (e.g., refer to intake airflow duct 100-1B of FIG. 8) through which the intake air from the filter 20 (i.e., air obtained by removing the foreign substances from the ambient air) flows.

As an example, the built-in valve 40 is united with the lower housing 10-2 and is located in the internal space of the filter case 10. The built-in valve 40 is located on a bottom surface of the lower housing 10-2, and is disposed to be intervened by an orthogonal corner of the lower housing 10-2 with respect to the intake port 30-1 located on the side surface of the lower housing 10-2.

Accordingly, the built-in valve 40 and the intake port 30-1 have different ambient air introduction directions and flow directions from each other, and act so that the ambient air introduced to the intake port 30-1 and the ambient air introduced to the built-in valve 40 do not severely disturb each other in the internal space of the filter case 10.

Figure 2:
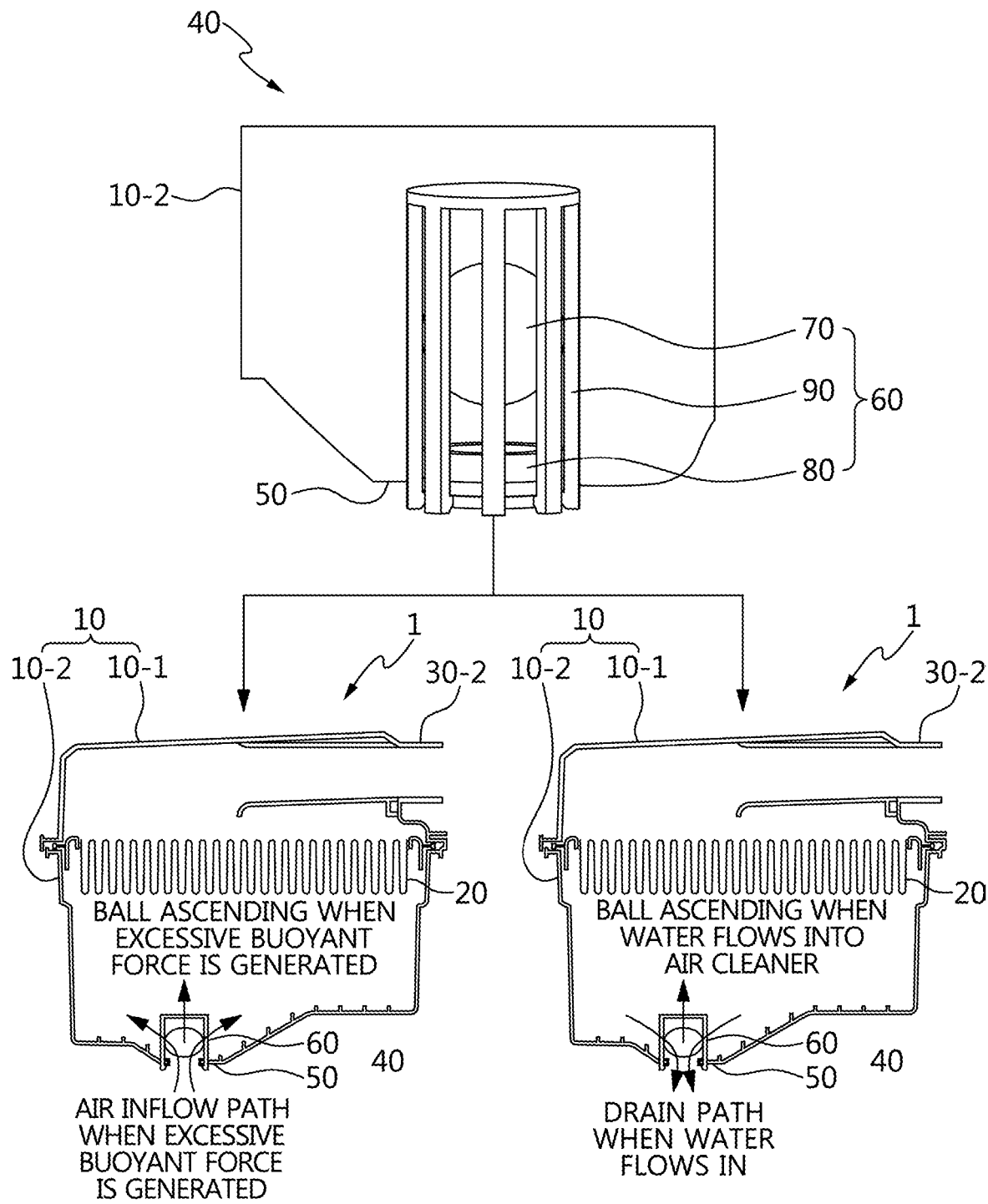
FIG. 2 is a diagram explaining a built-in value operation state of an air cleaner according to an exemplary embodiment of the present invention.

Referring to FIG. 2, the built-in valve 40 includes a valve fixer 50 and a ball valve 60. The valve fixer 50 is unitedly formed with the lower housing 10-2 of the filter case 10, and the ball valve 60 is assembled to be united with the lower housing 10-2 using the valve fixer 50.

The ball valve 60 includes a ball 70, an insulator 80, and a ball guide 90. If the suction force caused by the engine load and the buoyant force caused by the water are generated, the ball 70 ascends to open an open hole 51-1 of the valve fixer 50, whereas if the suction force and the buoyant force have vanished, the ball 70 descends to close the inlet of the valve.

The insulator 80 is made of polyurethane or a rubber material, and absorbs impacts due to descending movement of the ball 70 after ascending movement thereof. The ball guide 90 has a lattice frame structure configured to make the air, water, and foreign substances pass through the ball guide as limiting an ascending distance of the ball 70.

With reference to the operation of the built-in valve 40 for additional ambient air introduction in the right upper drawing of FIG. 2, the suction force generated due to the increase of the engine load makes the ball 70 that comes in contact with the insulator 80 ascend to be spaced from the insulator 80, and the ambient air comes into the lower housing 10-2 through the valve fixer 50 (i.e., the open hole 51-1 of FIG. 3) and is introduced into the internal space of the filter case 10.

On the other hand, with reference to the operation of the built-in valve 40 for water drain in the right lower drawing of FIG. 2, the buoyant force generated due to the water which is gathered on the bottom surface of the lower housing 10-2 and fills around the valve fixer 50 in the internal space of the filter case 10 makes the ball 70 that comes in contact with the insulator 80 ascend to be spaced from the insulator 80, and the water and the foreign substances come out of the internal space of the lower housing 10-2 through the valve fixer 50 (i.e., the open hole 51-1 of FIG. 3) and is discharged to the outside of the filter case 10.

Accordingly, the built-in valve 40 is opened by the increase of the engine load due to an internal factor, such as an engine power performance, to introduce additional ambient air into the internal space of the filter case 10, and is opened by the buoyant force generated due to an external factor, such as water inflow, to discharge the water and the foreign substances out of the filter case 10.

As described above, the built-in valve 40 can implement additional ambient air introduction through automated opening and closing operations, improvement of the engine output and fuel economy, and performance coping with an inflow of the foreign substances more effectively.

FIG. 3, FIG. 4, FIG. 5 and FIG. 6 exemplify the detailed configurations of a valve fixer 50, a ball 70, an insulator 80, and a ball guide 90 and an assembly structure for being united with a built-in valve 40.

Figure 3:
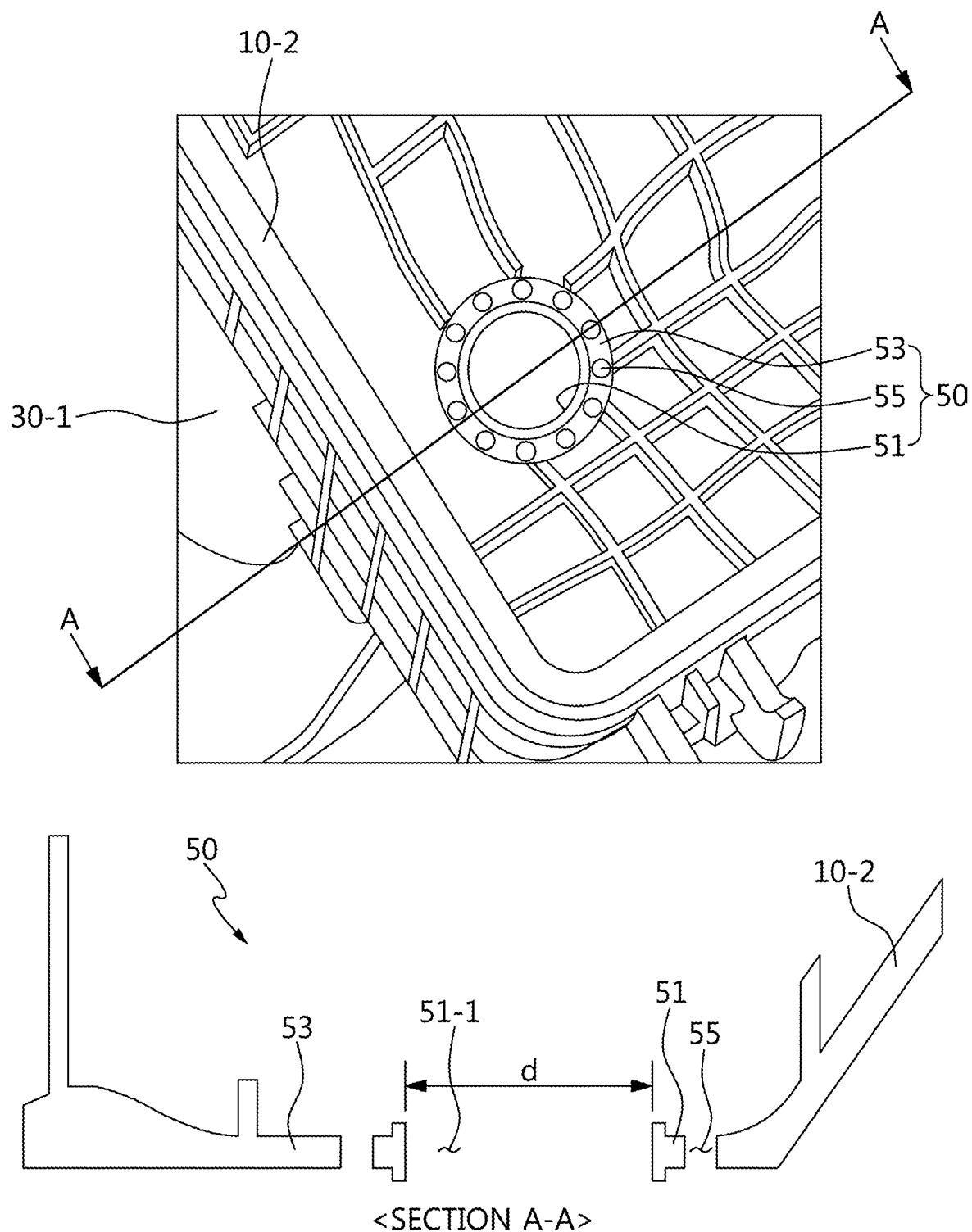
FIG. 3 is a diagram illustrating the detailed configuration of a valve fixer as a constituent element of a built-in valve according to an exemplary embodiment of the present invention.

Referring to FIG. 3, the valve fixer 50 includes a position ring 51, an open hole 51-1, a position girth 53, and an insertion hole 55. The valve fixer 50 includes a caved surface which is lower than the bottom surface formed on the lower housing 10-2 of the filter case 10, and the caved surface is formed as a space in which the water generated due to moisture in the internal space of the filter case 10 is stored.

The position ring 51 is formed as a circular border projecting from the bottom surface to form the border of the open hole 51-1 pierced in the bottom surface of the lower housing 10-2. The diameter d of the open hole 51-1 is set to suit the additional air flow which is varied due to the increase of the engine load.

Since the position girth 53 is formed as the caved surface which is lower than the bottom surface of the lower housing 10-2 as surrounding the position ring 51, the position girth 53 is formed as a water storage space filled with the water flowing or gathered in the internal space of the lower housing 10-2 of the filter case 10. A plurality of insertion holes 55 formed at predetermined intervals on the girth of the position ring 51 in the position girth 53.

Accordingly, the position ring 51 acts as a coupling region of the insulator 80. The open hole 51-1 acts as an ambient air inlet and an outlet for discharging the water and the foreign substances. The insertion hole 55 acts as a coupling region of the ball guide 90.

Figure 4:
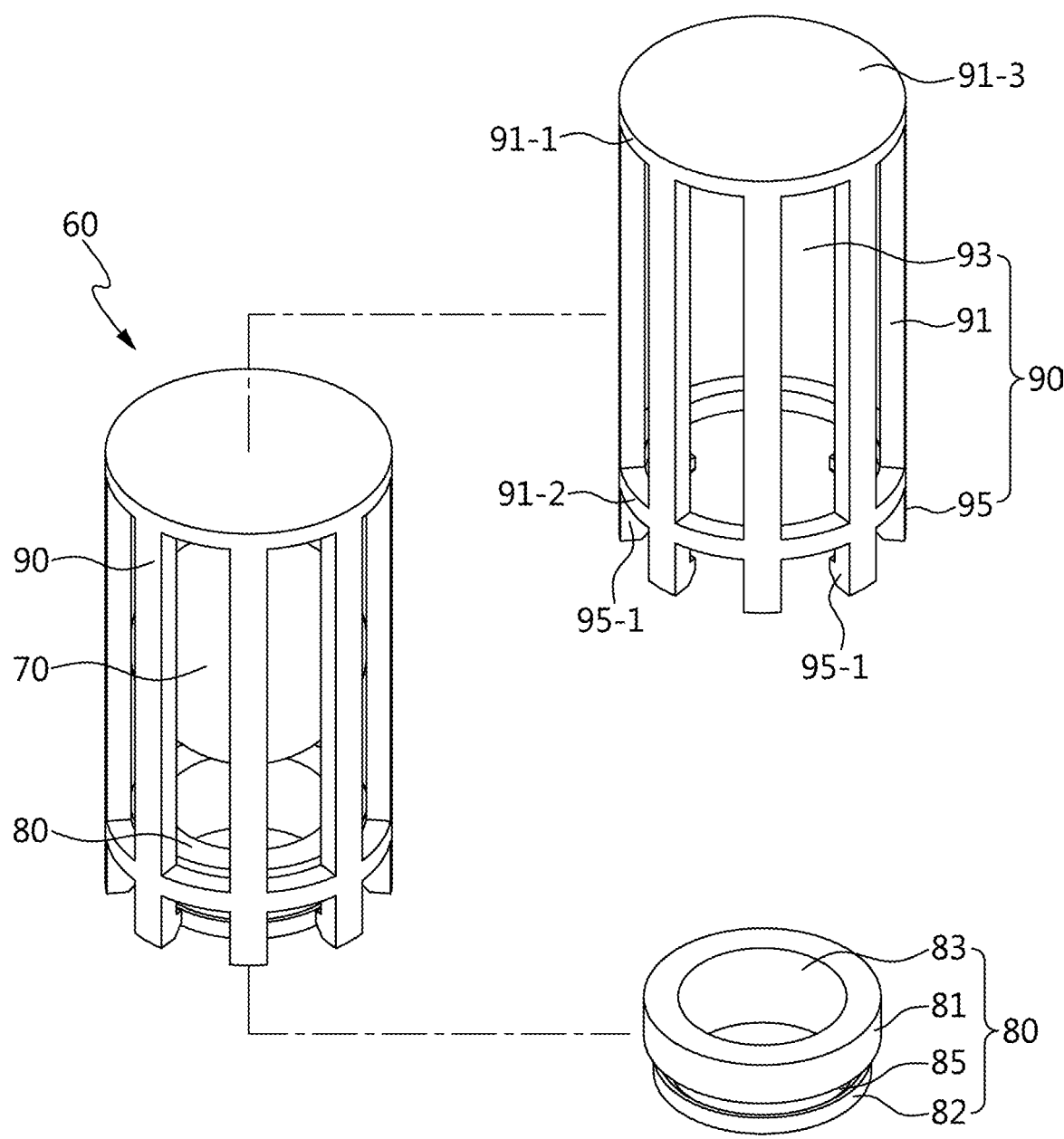
FIG. 4 is a diagram illustrating the detailed configuration of a ball valve as a constituent element of a built-in valve according to an exemplary embodiment of the present invention.

Referring to FIG. 4, the ball valve 60 includes the ball 70, the insulator 80, and the ball guide 90.

The ball 70 is in a spherical shape, and operates like a ball of a check valve.

The insulator 80 is made of an elastic material in a hollow cylindrical shape on which an insulator body, a flow hole 83, and an insertion groove 85 are formed. The insulator body includes an impact absorption body 81 pierced by the flow hole 83 and a coupling body 82, and the insertion groove 85 is formed to be caved on an external periphery of a connection region of the impact absorption body 81 and the coupling body 82.

As an example, the impact absorption body 81 forms a seat surface on which the ball 70 is accommodated with a diameter which is greater than the diameter of the coupling body 82 extending on an opposite side of the seat surface. The coupling body 82 is united with the impact absorption body 81 with the diameter which is smaller than the diameter of the impact absorption body 81, and forms a concentric circle with the impact absorption body 81.

As an example, the flow hole 83 penetrates the impact absorption body 81 and the coupling body 82 and communicates with the open hole 51-1 of the valve fixer 50. The insertion groove 85 is caved on the girth of the coupling body 82, and the position ring 51 of the valve fixer 50 is fitted into the insertion groove 85.

The insertion groove 85 is in "⊣" cross-sectional shape (refer to FIG. 5), and forms a strong fixing force after being mounted with the position ring 51.

The ball guide 90 made of an elastic material in a cylindrical lattice frame on which a lattice frame body 91, a ball space 93, and an insertion end portion 95 are formed.

As an example, on the lattice frame body 91, thin frames connecting an upper ring 91-1 and a lower ring 91-2 formed at upper and lower end portions of the body 91 are disposed at intervals, and thus do not discriminate internal and external spaces from each other.

In an exemplary embodiment of the present invention, ball guide 90 further include a cover 91-3 covering the upper ring 91-1 to prevent the ball 70 from leaving the ball guide 90.

The ball space 93 is formed on the internal to the lattice frame body 91 accommodating the ball 70. The insertion end portion 95 extends from each frame of the lattice frame body 91 and projects from the lower ring 91-2 (or upper ring 91-1).

As an example, the hook 95-1 has a structure in which an end portion of the insertion end portion 95 is bent to be gathered inwardly of the ball space 93, and is hooked is hooked in the position girth 53 of the valve fixer 50.

The number of insertion end portions 95 is set to be equal to the number of insertion grooves 55.

Figure 5:
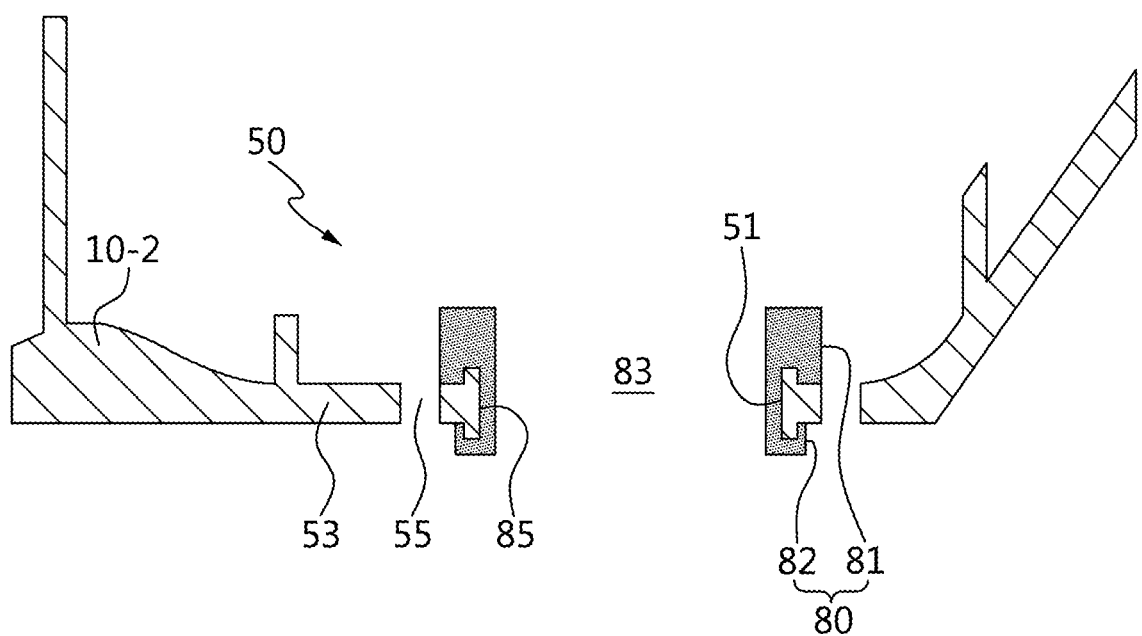
FIG. 5 is a diagram illustrating an assembly state between a valve fixer and an insulator of a ball valve according to an exemplary embodiment of the present invention.

Referring to FIG. 5, the valve fixer 50 and the insulator 80 are assembled by inserting the insulator 80 into the valve fixer 50.

As an example, the "⊣" cross-sectional region of the insertion groove 85 is inserted into the position ring 51 of the valve fixer 50 after introduction of deformation by an elastic force by slightly pressing the impact absorption body 81 and the coupling body 82 of the insulator 80. As such, the assembling of the insulator 80 with the valve fixer 50 is completed.

Accordingly, the insulator 80 secures a stable fixing force with the valve fixer 50 using the insertion groove 85, and the flow hole 83 of the insulator 80 is formed to communicate with the open hole 51-1 of the valve fixer 50 on the same line.

Figure 6:
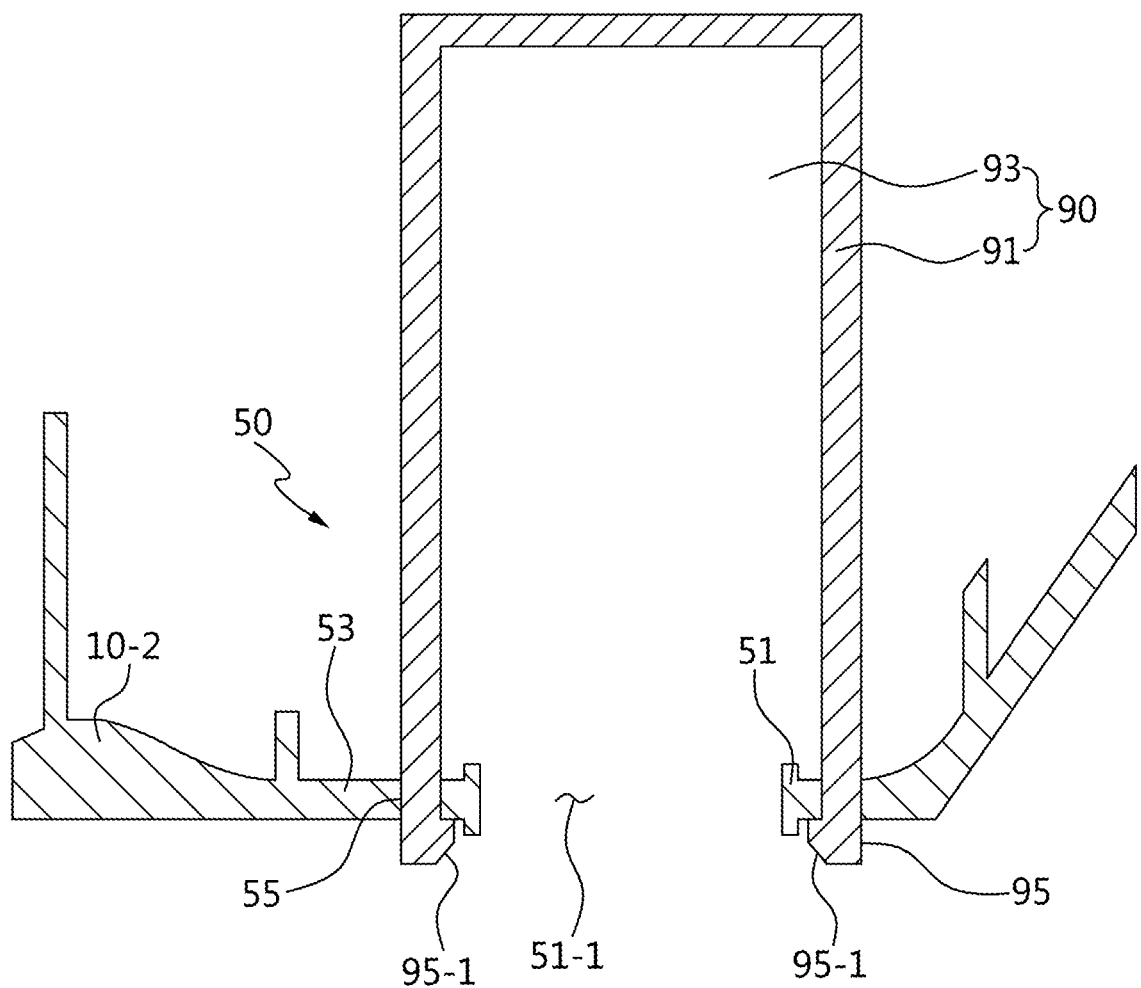
FIG. 6 is a diagram illustrating an assembly state between a valve fixer and a ball guide of a ball valve according to an exemplary embodiment of the present invention.

Referring to FIG. 6, the valve fixer 50 and the ball guide 90 are assembled by inserting the ball guide 90 into the valve fixer 50.

As an example, the insertion end portion 95 is inserted into the insertion hole 55 of the valve fixer 50 after introduction of deformation by an elastic force by slightly pressing the frame body 91 and the insertion end portion 95 of the ball guide 90. As such, the assembling of the ball guide 90 with the valve fixer 50 is completed.

However, the ball guide 90 may not be assembled with the valve fixer 50 after pre-putting the ball 70 in the ball space 93. In the instant case, by pushing the ball 70 into the flow hole 83 using deformation by an elastic force of the insulator 80, the ball 70 may be inserted into the ball space 93 of the ball guide 90.

Through this, the ball guide 90 secures a stable fixing force with the valve fixer 50 in a state where the hook 95-1 of the insertion end portion 95 is hooked in the position girth 53 of the valve fixer 50, and the ball 70 can stably ascend or descend in the ball space 93 of the ball guide 90.

Accordingly, the built-in valve 40 is built in the filter case 10 using the lower housing 10-2, and is united with the air cleaner 1 in a built-in type.

Figure 7A:
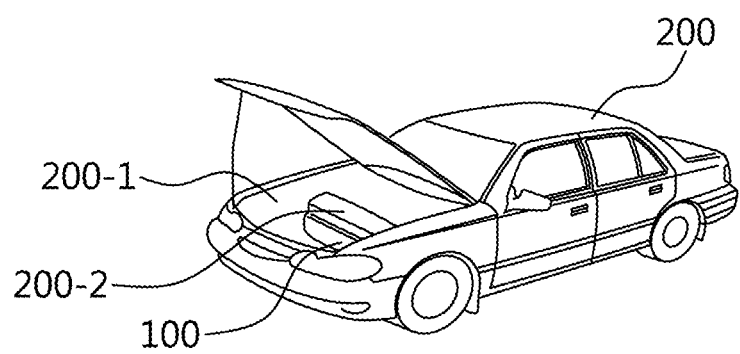
FIG. 7A and FIG. 7B are diagrams illustrating an example of a vehicle having an intake system adopting a built-in valve applied air cleaner according to an exemplary embodiment of the present invention.
Figure 7B:
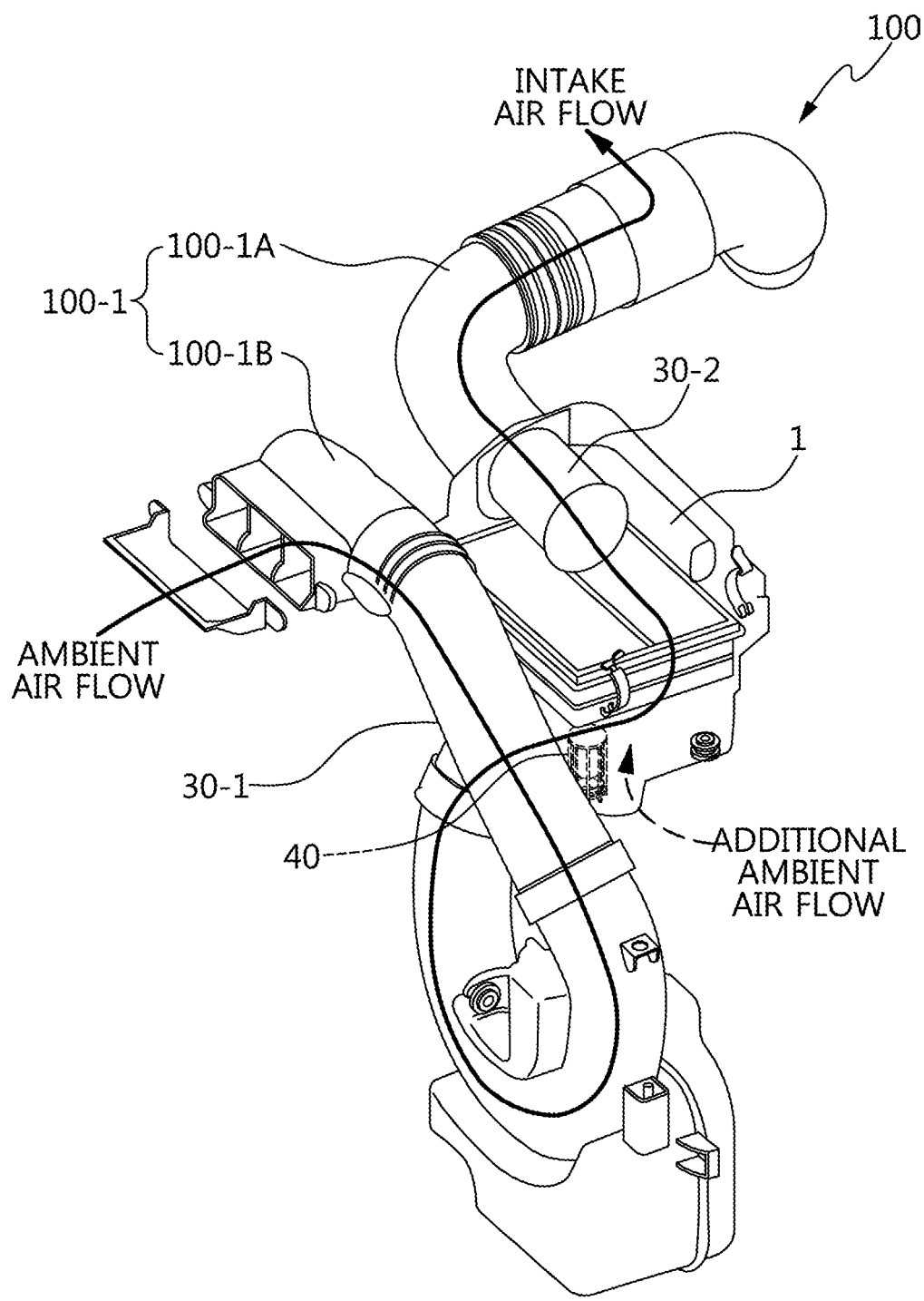
Figure 8:
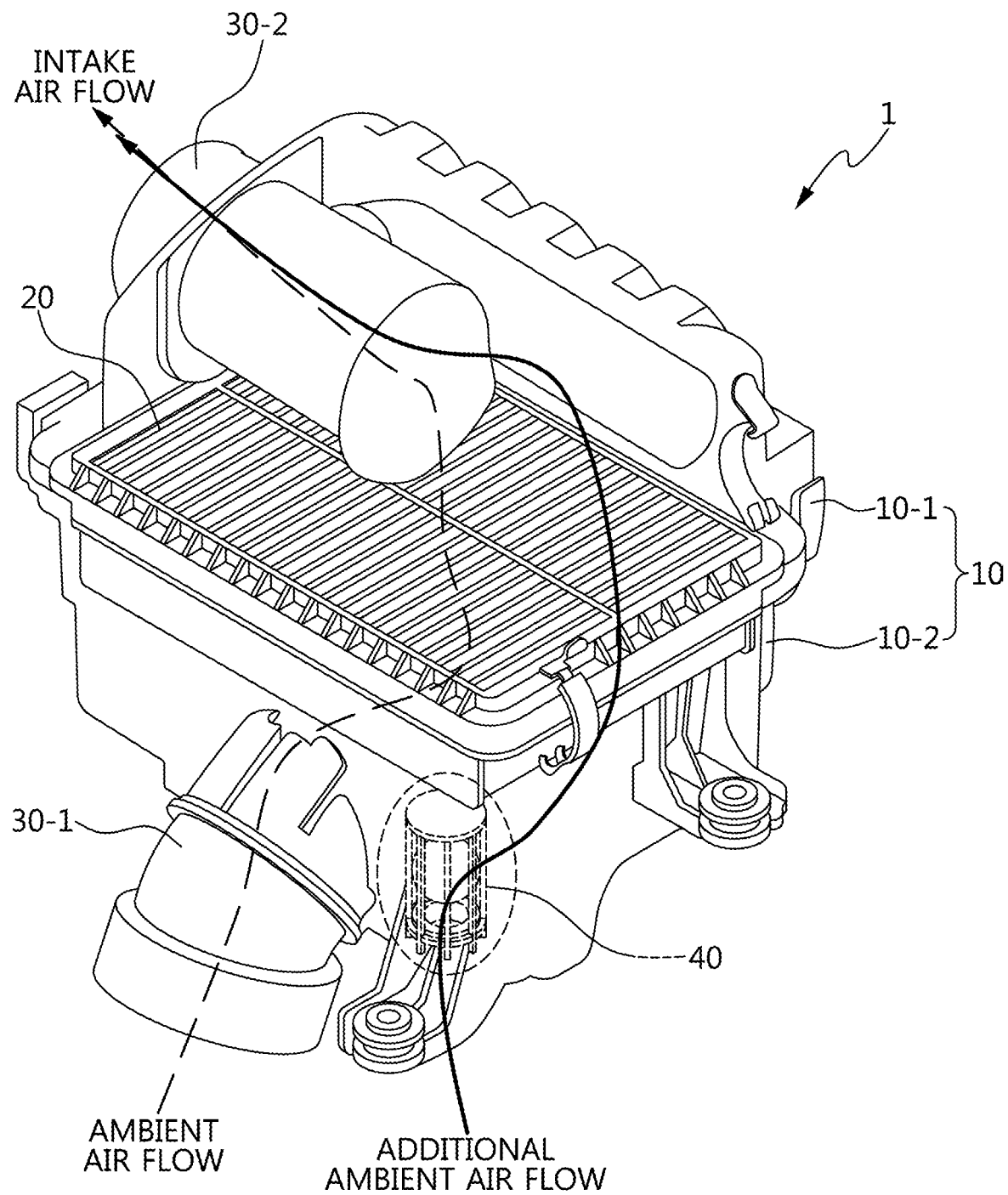
FIG. 8 is a diagram explaining a state where ambient air introduction through an intake duct and additional ambient air introduction through a built-in valve are performed during ambient air introduction of an air cleaner according to an exemplary embodiment of the present invention.

On the other hand, FIGS. 7A and 7B and FIG. 8 illustrate an example of a vehicle 200 having an intake system 100 adopting an air cleaner 1 according to an exemplary embodiment of the present invention.

Referring to FIGS. 7A and 7B, a vehicle 200 includes an intake system 100 provided with an air cleaner 1 having a built-in valve 40 together with an engine 200-2 in an engine compartment 200-1.

As an example, the engine 200-2 may be one of various types of engines, such as gasoline engine, diesel engine, LPG engine, and CNG engine.

As an example, the intake system 100 is provided with an intake manifold 100-1 connected to a combustion chamber of the engine 200-2, and the intake manifold 100-1 is provided with the air cleaner 1 to which intake air flow obtained by removing foreign substances from ambient air is supplied.

As an example, the air cleaner 1 includes a filter case 10, a filter 20, an intake port 30-1, an intake airflow port 30-2, and a built-in valve 40. The built-in valve 40 is united with a lower housing 10-2 to be located in an internal space of the filter case 10, and includes a valve fixer 50, a ball 70, an insulator 80, and a ball guide 90 in the same manner as the air cleaner 1 of FIGS. 1 to 6.

However, an ambient duct 100-1A for drawing the ambient air is connected to the intake port 30-1, and an intake airflow duct 100-1B for sending intake air purified by a filter 20 is connected to the intake airflow port 30-2. Accordingly, in contrast with the air cleaner 1 of FIGS. 1 to 6, the air cleaner 1 forms the intake system 100 via the ambient duct 100-1A and the intake airflow duct 100-1B.

Referring to FIG. 8, ambient air introduction in the air cleaner 1 is implemented by ambient air introduction by the intake port 30-1 and additional ambient air introduction by the built-in value 40.

As an example, the ambient air introduction by the intake port 30-1 is performed by a suction force due to a driving load of the engine 200-2 in a state where the built-in valve 40 is closed. Accordingly, the ambient air introduction by the intake port 30-1 is performed in a state where the ambient air is typically supplied to the engine 200-2. In contrast, the additional ambient air introduction by the built-in valve 40 is performed in a state where more ambient air is supplied to the engine 200-2 by generating a relatively strong suction force in the internal space of the air cleaner 1 caused by the increase of the driving load of the engine 200-2 due to the internal factor, such as the engine power performance.

Accordingly, if the additional ambient air introduction of the built-in valve 40 is performed, the strong suction force generated in the internal space of the air cleaner 1 makes the ball 70 of the built-in valve 40 ascend, and the ball 70 and the insulator 80 are converted to a separation state.

Through this, the flow hole 83 of the insulator 80 communicates with the open hole 51-1 of the valve fixer 50, and thus internal and external spaces of the air cleaner 1 communicate with each other. Accordingly, the open hole 51-1 and the flow hole 83 act as air paths to draw the ambient air from the outside of the air cleaner 1 to the internal space.

As a result, the ambient air flow through the intake port 30-1 and the additional ambient air flow through the built-in valve 40 are supplied into the internal space of the air cleaner 1, and the engine 200-2 is driven with the required air flow that suits the increase of the engine load to achieve the fuel economy improvement together with the engine output increase.

As described above, the air cleaner 1 applied to the intake system 100 according to an exemplary embodiment of the present invention includes the filter case 10 configured to convert the ambient air introduced from the intake port 30-1 through the filter 20 provided in the internal space into the intake air from which the foreign substances are removed and to discharge the intake air from the intake airflow port 30-2, and the built-in valve 40 provided in the internal space of the filter case 10 and configured to be opened by the increase of the suction force due to the increase of the engine load to introduce the ambient air through the intake port 30-1 and the other path or to be opened by the buoyant force of the water gathered in the internal space to discharge the water. Accordingly, the duct, the hose, and the valve are united into the built-in valve 40, and, the opening and closing operations of the built-in valve 40 are automated by the engine load due to the internal factor, such as the engine power performance and the buoyant force due to the external factor, such as the water inflow. Accordingly, the engine output, the fuel economy, and the performance coping with the inflow of the foreign substances may be greatly improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air cleaner comprising:
   a filter case configured to introduce, by a suction force of an internal space, ambient air being discharged through a filter provided in the internal space as intake air from which foreign substances are removed; and
   a built-in valve built in the internal space of the filter case and configured to form a first ambient air introduction path for introducing the ambient air and a second ambient air introduction path separated from the first ambient air introduction path and to open the second ambient air introduction path,
   wherein the ambient air flows into through the second ambient air introduction path when the suction force is increased,
   wherein the built-in valve includes:
      a valve fixer configured to form the second ambient air introduction path through an open hole in the internal space of the filter case; and
      a ball valve coupled to the valve fixer and configured to receive the suction force and the buoyant force, and wherein the ball valve includes:
      a ball configured to receive the suction force and the buoyant force and to selectively ascend to open the second ambient air introduction path;
      an insulator coupled to the valve fixer and configured to form a flow hole communicating with the open hole and selectively clogged by the ball; and
      a ball guide configured to make the air and the water pass through the ball guide as confining the ball in the ball guide and limiting an ascending distance of the ball.

2. The air cleaner according to claim 1,
   wherein the first ambient air introduction path and the second ambient air introduction path are separately located in predetermined locations of the filter case.

3. The air cleaner according to claim 2,
   wherein the first ambient air introduction path is located on a side surface of the filter case, and
   wherein the second ambient air introduction path is located at a lower portion of the filter case.

4. The air cleaner according to claim 1,
   wherein the built-in valve is configured to open the second ambient air introduction path by a buoyant force of water gathered around the second ambient air introduction path in the internal space of the filter case.

5. The air cleaner according to claim 1,
wherein the valve fixer is configured to form a water storage space filled with water in the internal space of the filter case, and
wherein the water storage space is configured to surround the second ambient air introduction path.

6. The air cleaner according to claim 1, wherein the valve fixer and the insulator are coupled to each other in an insertion structure.

7. The air cleaner according to claim 6, wherein the insertion structure includes:
a position ring projecting to surround the open hole of the valve fixer; and
an insertion groove recessed on an external periphery of an insulator body in which the flow hole of the insulator is pierced.

8. The air cleaner according to claim 1, wherein the ball guide has a lattice frame structure through which the air and the water pass.

9. The air cleaner according to claim 1, wherein the valve fixer and the ball guide are coupled to each other in a hook structure.

10. The air cleaner according to claim 9, wherein the hook structure includes:
an insertion hole pierced on a position girth forming a circumference surrounding the open hole of the valve fixer; and
an insertion end portion projecting from an end portion of a side of the ball guide.

11. The air cleaner according to claim 10,
wherein a hook is formed at the insertion end portion, and
wherein the hook is bent inwardly from an end portion of the insertion end portion and is hooked in the position girth.

12. The air cleaner according to claim 1,
wherein the filter case includes an upper housing and a lower housing detachably attached to each other by a clamp, and
wherein the first ambient air introduction path and the second ambient air introduction path are formed in the lower housing.

13. The air cleaner according to claim 12,
wherein an intake port for inflow of the ambient air to the first ambient air introduction path is provided in the lower housing, and
wherein an intake airflow port for discharging the intake air is provided in the upper housing.

14. An intake system comprising:
the air cleaner of claim 1,
wherein the air cleaner is provided with the filter case configured to convert the ambient air introduced from an intake port through the filter in the internal space into the intake air from which the foreign substances are removed and to discharge the intake air from an intake airflow port, and the built-in valve configured to be opened by an increase of a suction force due to an increase of an engine load to introduce the ambient air through the intake port and a path or to be opened by a buoyant force of water gathered in the internal space to discharge the water.

15. The intake system according to claim 14, wherein the built-in valve is built in the internal space of the filter case.

16. The intake system according to claim 15, wherein a water storage space for generating the buoyant force is formed around the built-in valve.

17. The intake system according to claim 14, wherein an ambient duct for drawing the ambient air is connected to the intake port.

18. The intake system according to claim 14, wherein an intake airflow duct for sending the intake air to an intake manifold connected to an engine is connected to the intake airflow port.

* * * * *